Sept. 20, 1949.  R. R. GOSHORN  2,482,266
BACK PANEL FOR FLASHER CASINGS OR THE LIKE
Filed Feb. 11, 1947

INVENTOR.
ROBERT R. GOSHORN.
BY Allen & Allen
ATTORNEYS.

Patented Sept. 20, 1949

2,482,266

UNITED STATES PATENT OFFICE 2,482,266

BACK PANEL FOR FLASHER CASINGS OR THE LIKE

Robert R. Goshorn, Cincinnati, Ohio, assignor to Automatic Electrical Devices Company, Cincinnati, Ohio, a corporation of Ohio Application February 11, 1947, Serial No. 727,789

3 Claims. (Cl. 177—329)

My invention relates to a gaseous tube flasher circuit and back panel mounting therefor. It is my object to provide a back panel which will compactly retain and mount the elements of a gaseous tube flasher consisting of a battery or batteries, a condenser and resistor and a tube socket, wherein strength and rigidity is provided and where ready access may be had due to the arrangement of the parts for the replacing of the batteries or tube with a minimum of danger from shock.

It is particularly my object to economize in space so that the complete unit and its necessary parts will be between and at one end of the batteries so that the batteries may be withdrawn as required, and wherein the construction of the panel itself is such as to rigidly support the batteries, and by a novel arrangement, provide a mounting for the gaseous tube which will fit compactly in between the walls supporting the batteries, with a minimum of space being required.

It is my object to provide such construction in a rectangular panel of a width only slightly more than that of two dry cells and of a height only slightly more than that required for the batteries plus the diameter of the condenser.

The foregoing objects and other objects to which reference will be made in the ensuing description, I accomplish by that certain combination and arrangement of parts of which I have illustrated a preferred embodiment.

Figure 1:
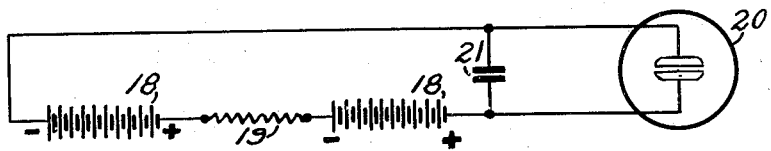
Figure 1 is a wiring diagram of the circuit involved.
Figure 2:
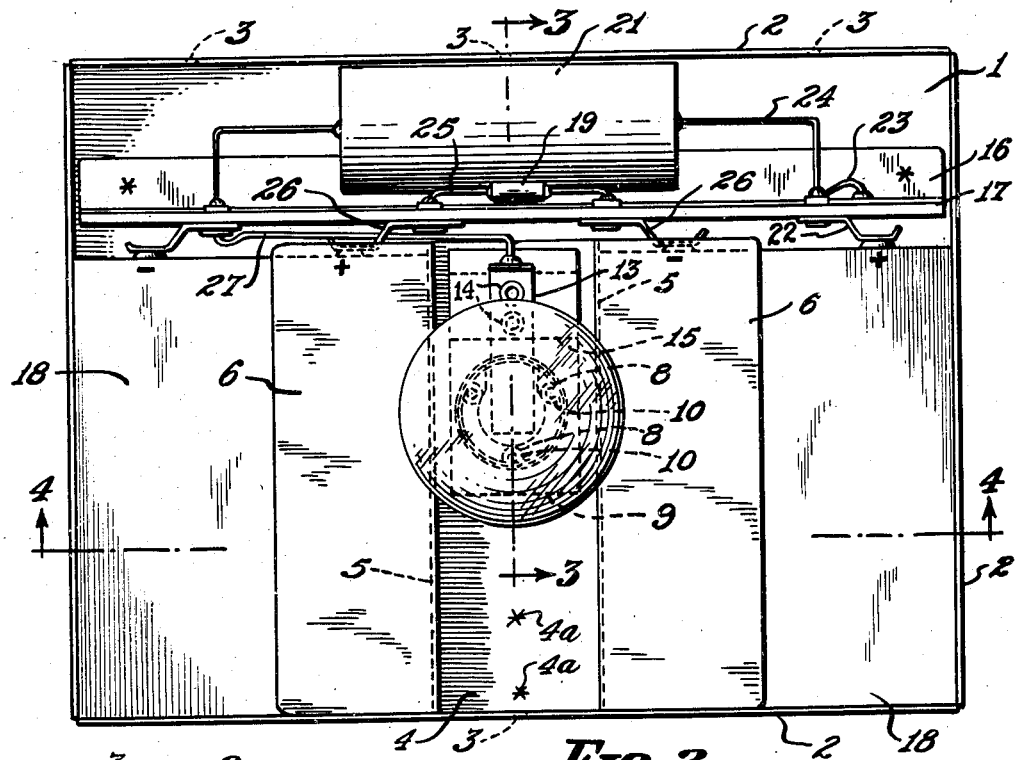
Figure 2 is a front elevation of the panel construction showing all the elements in position.
Figure 3:
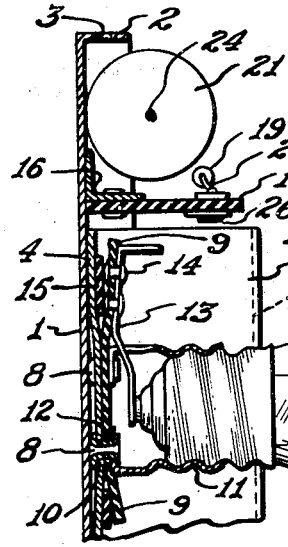
Figure 3 is a sectional view as would appear if taken along the lines 3—3 in Figure 2.

The back panel is composed of a metal plate 1 having the edges flanged over as shown at 2, and with openings as indicated at 3. A U-shaped angle plate having a base 4 and upstanding side walls 5 and flanged over sides 6 is spot welded as indicated at 4a, to the back panel. This plate has three openings through which are extended rivets 8 before the back panel is spot welded in position. An insulative panel 9 has matching holes 10 through which the rivets extend and a threaded shell 11 also has matching holes 12. When the heads of the rivets are clinched the whole assembly is held together rigidly and the outer wall of the shell is grounded to the base.

The insulative panel 9 has a spring plate 13 riveted to it as 14 and underneath an insulative panel 15 is placed, before the heads of the rivets 8 are clinched.

Another angle 16 is spot welded to the back plate and riveted to the upstanding wall of the angle there is a sturdy insulative panel 17.

The batteries illustrated in the particular unit shown consist in two 67½ volt dry cell packs 18 (there are 45 dry cells in each of the packs).

The resistor 19 shown is a resistor of 2.2 megohms. The glow lamp 20 illustrated is of the type manufactured and sold by the General Electric Company and known as their type NE 40, 3 watt neon glow lamp having a starting voltage of 85 volts D. C. The condenser 21 has a capacity of 1 microfarad.

The socket shell 11 is connected by means of the rivets 8 to the back plate and is a current carrying part. One of the contact springs 22 is connected to the back plate as shown at 23. This connects from the positive pole of the battery shown at the right. The condenser 21 is connected between the two outside contact springs 22 as with wires 24 from the negative pole of the battery on the left to the positive pole of the battery on the right. The resistor 19 is connected as with wires 25 between the two inside contact springs 26 from the positive terminal of the battery on the left to the negative terminal of the battery on the right as illustrated, thus placing it in series with the condenser 21 and the two batteries, but between the batteries. The center contact plate 13 to the lamp is connected to the end contact spring so that the negative terminal of the battery on the left is connected to the center contact plate as with a wire 27, thereby completing the circuit.

The placing of the resistor 19 between the batteries makes it unlikely for a person handling the device to receive a shock since it is impossible to touch two points in the battery circuit so as to cut out the resistor 19 and receive a voltage drop of 135 volts from the combined batteries in series.

Referring to the wiring diagram Figure 1, the two batteries 18, each having a voltage of 67½ volts, are wired in series with a resistor 19 of 2.2 megohms between them. A condenser 21 of 1 microfarad is wired in series with the batteries and resistor 19 so as to be charged by the combined batteries totaling 135 volts. Connected across the condenser 21 and in parallel therewith is a glow lamp 20 with a starting voltage of 85 volts. The high resistance of the resistor 19 prevents the batteries 18, 18 from starting the glow lamp 20, since the voltage drop at the glow lamp is less than the required starting voltage. The batteries 18, 18, therefore, charge the condenser 21. When the condenser 21 is charged above the starting voltage of the glow lamp 20, the condenser 21 will discharge through the lamp 20 and cause it to flash. In the circuit described, the duration of the flash of the glow lamp will be about one one-hundredth of a second and will be repeated at the rate of about fifty flashes per minute.

Due to the short duration of the flash of the glow lamp and its relative slow rate, the life of a circuit such as I have described should be a number of years. The current used by the glow lamp will be just about enough to keep the batteries in non-deteriorating condition.

Figure 4:
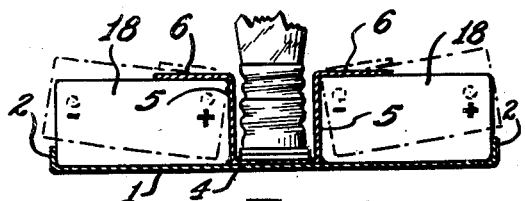
Figure 4 is a section along the lines 4—4 of Figure 2.

When it is desired to replace the battery all that is necessary is to pull upwardly on the edges of the battery remote from the outwardly extending flanged portions 6 of the U-shaped plate. The flanged portions 6 will permit sufficient spring to permit the batteries to be withdrawn. This operation is illustrated in Figure 4.

To fit up a flasher within a casing a concave reflector with a center opening is secured in proper position on the lamp and a front casing secured to the back panel with screws passing through the holes 3 at the top and bottom.

To illustrate how compactly the apparatus is housed because of the specific construction, the dry cells are 2¾ inches wide by 3½ inches high by 1¼ inches thick, totaling a surface area of 5½ by 3½ inches, and yet the entire assembly is arranged on a back plate 6⅝ inches high, between the flanged edges 2.

Having thus described my invention, what I claim as new and wish to secure by Letters Patent is:

1. A back panel for a flasher casing consisting of a plate provided with flanged edges for attachment to a flasher casing, a U-shaped plate consisting of a base attached medially of the panel, extensions extending up at right angles from the base at each side edge of the base, said extensions having end portions formed outwardly at right angles, whereby said outwardly formed portions will allow sufficient spring for releasably securing flatwise a pair of dry batteries, one on one side and the other on the other side of the U-shaped plate.

2. A back panel for a flasher casing consisting of a plate provided with flanged edges for attachment to a flasher casing, a U-shaped plate consisting of a base attached medially of the panel, extensions extending up at right angles from the base at each side edge of the base, said extensions having end portions formed outwardly at right angles, whereby said outwardly formed portions will allow sufficient spring for releasably securing flatwise a pair of dry batteries, one on one side and the other on the other side of the U-shaped plate, a screw socket assembly for receiving a lamp mounted in the space between the extensions of the base which extend upwardly at right angles and rivets extending through holes in the base clinched and holding the screw socket assembly rigidly in position.

3. A back panel for a flasher casing consisting of a U-shaped member medially mounted on the panel, a tube socket mounted medially of the U-shaped member and means extending outwardly from the U-shaped member for resiliently securing a pair of dry batteries one on one side and one on the other.

ROBERT R. GOSHORN.

REFERENCES CITED

The following references are of record in the file of this patent:

UNITED STATES PATENTS

| Number | Name | Date |
|---|---|---|
| 1,908,533 | Osnos | May 9, 1933 |
| 2,025,235 | Gonsett | Dec. 24, 1934 |
| 2,224,742 | Muldoon | Dec. 10, 1940 |
| 2,385,397 | Blackburn | Sept. 25, 1945 |